United States Patent
Fink et al.

(10) Patent No.: US 10,528,625 B2
(45) Date of Patent: Jan. 7, 2020

(54) CLIENT CLOUD SYNCHRONIZER

(71) Applicant: Cisco Technology, Inc., San Jose, CA (US)

(72) Inventors: David William Fink, Efrat (IL); Miles Colin John Davis, Middlesex (GB); Lalit Kataria, Johns Creek, GA (US); Fabien Locquet, Sèvres (FR); Meidad Zaharia, Rishon le Zion (IL); Omer Yanai, Jerusalem (IL); Reuven Nimrod, Mevasseret Zion (IL)

(73) Assignee: Cisco Technology, Inc., San Jose, CA (US)

(*) Notice: Subject to any disclaimer, the term of this patent is extended or adjusted under 35 U.S.C. 154(b) by 225 days.

(21) Appl. No.: 15/628,777

(22) Filed: Jun. 21, 2017

(65) Prior Publication Data

US 2018/0373811 A1    Dec. 27, 2018

(51) Int. Cl.
*G06F 16/907*    (2019.01)
*H04L 12/723*    (2013.01)
*H04W 56/00*    (2009.01)

(52) U.S. Cl.
CPC .......... *G06F 16/907* (2019.01); *H04L 45/507* (2013.01); *H04W 56/0015* (2013.01)

(58) Field of Classification Search
CPC . G06F 16/907; H04L 45/507; H04W 56/0015
See application file for complete search history.

(56) References Cited

U.S. PATENT DOCUMENTS

| | | | |
|---|---|---|---|
| 8,402,139 B2 | 3/2013 | Ferris et al. | |
| 8,407,413 B1* | 3/2013 | Yucel | H04L 69/22 709/203 |
| 9,619,371 B2 | 4/2017 | Adderly et al. | |
| 9,639,452 B2 | 5/2017 | Elias et al. | |
| 10,229,251 B1* | 3/2019 | Dalessio | G06F 8/60 |
| 10,235,527 B1* | 3/2019 | Dalessio | G06F 21/577 |
| 2004/0139319 A1* | 7/2004 | Favazza | H04L 63/0807 713/168 |
| 2008/0010287 A1* | 1/2008 | Hinton | H04L 29/12594 |
| 2013/0031274 A1* | 1/2013 | Nunez-Tejerina | H04L 12/6418 709/250 |
| 2013/0290234 A1* | 10/2013 | Harris | G06N 5/022 706/46 |
| 2014/0136675 A1* | 5/2014 | Yao | H04L 67/1097 709/223 |
| 2014/0379780 A1 | 12/2014 | Scheyter et al. | |
| 2016/0036721 A1* | 2/2016 | Payne, III | H04L 47/783 709/226 |
| 2016/0117160 A1 | 4/2016 | Parthasarathy et al. | |

(Continued)

*Primary Examiner* — Jerry B Dennison
(74) *Attorney, Agent, or Firm* — Merchant & Gould P.C.

(57) ABSTRACT

Client and cloud synchronization may be provided. First, a request may be received. Then the request may be labeled with a package metadata tag yielding a labeled request. The package metadata tag may identify a package assigned to a client device corresponding to the request. Next, the labeled request may be routed to a version of a first cloud service component based on the package metadata tag. The labeled request may then be routed from the version of the first cloud service component to a version of a second cloud service component based on the package metadata tag.

20 Claims, 3 Drawing Sheets

(56) References Cited

U.S. PATENT DOCUMENTS

| | | | |
|---|---|---|---|
| 2016/0182684 A1* | 6/2016 | Connor | G06F 9/45558 709/203 |
| 2016/0371102 A1* | 12/2016 | Kim | G06F 9/45558 |
| 2017/0048815 A1* | 2/2017 | Clarke | H04W 64/00 |
| 2017/0054792 A1* | 2/2017 | Christopher, II | H04L 67/10 |
| 2017/0097851 A1* | 4/2017 | Chen | G06F 9/5077 |
| 2017/0288909 A1* | 10/2017 | Bottorff | H04L 12/6418 |
| 2017/0331672 A1* | 11/2017 | Fedyk | H04L 45/306 |
| 2017/0331862 A1* | 11/2017 | Wang | H04L 29/06 |
| 2017/0367026 A1* | 12/2017 | Li | H04W 12/06 |
| 2018/0091410 A1* | 3/2018 | Browne | H04L 43/10 |
| 2018/0139075 A1* | 5/2018 | Doherty | H04L 12/4641 |
| 2018/0198791 A1* | 7/2018 | Desai | H04L 63/10 |
| 2018/0331909 A1* | 11/2018 | Zhang | H04L 41/0893 |
| 2018/0373811 A1* | 12/2018 | Fink | H04L 45/507 |

\* cited by examiner

CLIENT CLOUD SYNCHRONIZER

TECHNICAL FIELD

The present disclosure relates generally to cloud television.

BACKGROUND

Cloud computing is a model that allows access to a shared pool of configurable computing resources. Cloud computing and storage solutions provide users and enterprises with various capabilities to store and process their data in third-party data centers. It shares resources to achieve coherence and economies of scale.

Cloud computing also focuses on maximizing the effectiveness of the shared resources. Cloud resources are usually not only shared by multiple users, but are also dynamically reallocated per demand. This can work for allocating resources to users. For example, a cloud computer facility that serves European users during European business hours with a specific application (e.g., e-mail) may reallocate the same resources to serve North American users during North American business hours with a different application (e.g., a web server). This approach helps maximize computing power use while reducing the overall resources cost by using, for example, less power, air conditioning, rack space, to maintain the system. With cloud computing, like other client-server architectures, multiple users can access a single server to retrieve and update their data without purchasing licenses for different applications.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
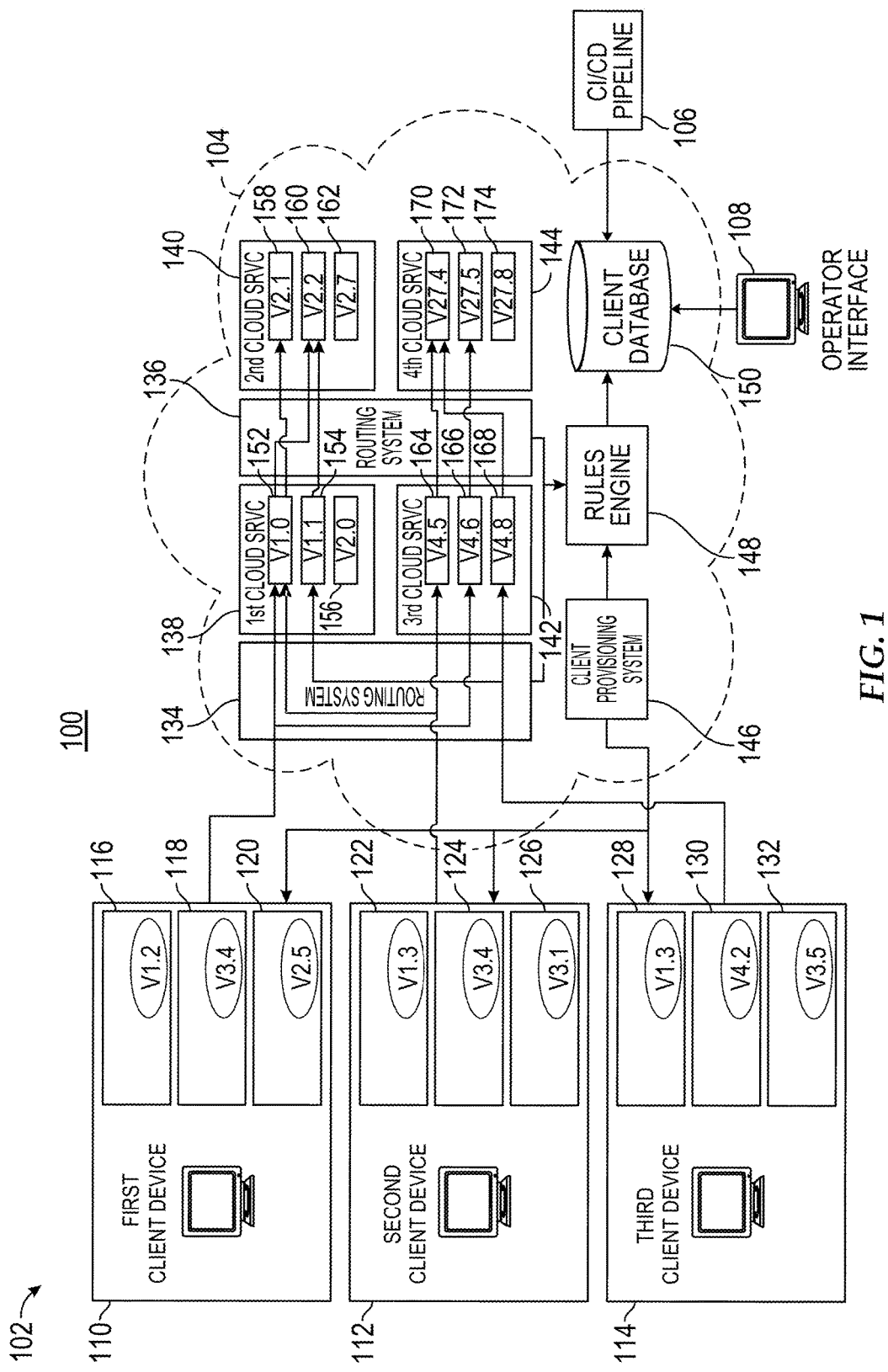
FIG. 1 is a block diagram of an operating environment for providing client and cloud synchronization.

Client and cloud synchronization may be provided. First, a request may be received. Then the request may be labeled with a package metadata tag yielding a labeled request. The package metadata tag may identify a package assigned to a client device corresponding to the request. Next, the labeled request may be routed to a version of a first cloud service component based on the package metadata tag. The labeled request may then be routed from the version of the first cloud service component to a version of a second cloud service component based on the package metadata tag.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Pay television (TV) systems may comprise complex cloud based systems that may provide services to client based hardware and software where client device hardware and software may be managed by, for example, a system operator. In cloud based systems, features may be continuously developed, integrated, and deployed. In this operating environment, different client devices may run and utilize different versions of client and cloud software components and services, for example, as either part of canary releases or to enable A/B testing. Specific clients may be loaded with different versions of client software components and have their requests directed to different versions of cloud services.

When multiple components or services are being developed simultaneously, keeping track of the permutations of versions may become difficult to manage. For example, it may be difficult to recreate a situation where a bug occurred because new versions of components and services may be continuously added. Although a given release of a component or service may have been tested before being deployed in a production system, this may create problems when running together with specific releases of other components and services.

Embodiments of the disclosure may provide that, at run time, each client device may run a combination of client software components and use the combination of cloud software components (i.e., artifacts) defined by a package. The system operator may provide that the software components operate correctly together and provide a desired experience. Using a Continuous Integration and Continuous Deployment (CI/CD) processes, the system operator may ensure that the software components that comprise a package have been tested together. For example, embodiments of the disclosure may allow system operators to manage many versions of many client and cloud software components in a single system that may provide different user experiences and system behaviors for different user communities and different client devices. Each of these experiences may be provided by a combination of these software components. Accordingly, embodiments of the disclosure may deploy, for example, multiple versions of components at the same time, in order to: i) deploy new features and other software changes in a canary fashion (5% to start, 10% a bit later, etc.); and ii) try out new behavior on a subset of client devices (e.g., A/B testing).

In conventional cloud deployment systems, requests are routed to each version of the cloud services based on rules for that service. In these conventional cloud deployment systems, there is no single system that controls the applications, components, services, and other artifacts that a specific client uses. This may consequently create problems when clients request, for example, access to different combinations of cloud services that may not work together, or with the software versions deployed on that client.

Embodiments of the disclosure may comprise packages that may allow for testing a specific set of service versions and how they work together before deployment. This may be accomplished using the CI/CD pipeline where each package deployed into the CI/CD pipeline may be tested before being deployed into a production system. Requests may not traverse paths between applications, components, services, and artifacts that may not be defined by a package and that may not have been tested.

FIG. 1 is a block diagram of an operating environment 100 for providing client and cloud synchronization. Operating environment 100 may comprise, but is not limited to, a pay television TV operating environment. As shown in FIG. 1, operating environment 100 may comprise plurality of client devices 102, cloud computing system 104, continuous Integration and Deployment (CI/CD) pipeline 106, and operator interface 108.

Plurality of client devices 102 may comprise a first client device 110, a second client device 112, and a third client device 114. Each of the plurality of client devices 102 may comprise, but are not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device.

First client device 110 may comprise a first client device application 116, a first client device first component 118, and a first client device second component 120. First client device 110 may comprise a first hardware type such as, but not limited to, a managed device (e.g., a set-top box). First client device application 116, first client device first component 118, and first client device second component 120 may comprise versions of software artifacts that define a full user experience and operation for first client device 110 that an operator of cloud computing system 104 wishes first client device 110 to have.

Second client device 112 may comprise a second client device application 122, a second client device first component 124, and a second client device second component 126. Second client device 112 may comprise a second hardware type such as, but not limited to, a tablet device running an operating system (e.g., iOS version 10.3.2). Second client device application 122, second client device first component 124, and second client device second component 126 may comprise versions of software artifacts that define a full user experience and operation for second client device 112 that an operator of cloud computing system 104 wishes second client device 112 to have.

Third client device 114 may comprise a third client device application 128, a third client device first component 130, and a third client device second component 132. Third client device 114 may comprise a third hardware type such as, but not limited to, a smartphone running an operating system (e.g., Android version 7.0 Nougat). Third client device application 128, third client device first component 130, and third client device second component 132 may comprise versions of software artifacts that define a full user experience and operation for third client device 114 that an operator of cloud computing system 104 wishes third client device 114 to have.

First client device application 116, second client device application 122, and third client device application 128 may carry out a similar function, but may or may not comprise different versions of the same software artifact. For example, these different versions may be correspondingly configured to work with different hardware types of plurality of client devices 102. Moreover, these different versions may be configured to give correspondingly different experiences to different users (e.g., in different user communities) of plurality of client devices 102.

First client device first component 118, second client device first component 124, and third client device first component 130 may carry out a similar function, but may or may not comprise different versions of the same software artifact. For example, these different versions may be correspondingly configured to work with different hardware types of plurality of client devices 102. Moreover, these different versions may be configured to give correspondingly different experiences to different users (e.g., in different user communities) of plurality of client devices 102.

First client device second component 120, second client device second component 126, and a third client device second component 132 may carry out a similar function, but may or may not comprise different versions of the same software artifact. For example, these different versions may be correspondingly configured to work with different hardware types of plurality of client devices 102. Moreover, these different versions may be configured to give correspondingly different experiences to different users (e.g., in different user communities) of plurality of client devices 102.

Cloud computing system 104 may comprise a first routing system 134, a second routing system 136, a first cloud service 138, a second cloud service 140, a third cloud service 142, a fourth cloud service 144, a client provisioning system 146, a rules engine 148, and a cloud database 150. First routing system 134 may comprise one or more devices that may receive requests for services from plurality of client devices 102 and routes them to first cloud service 138 or third cloud service 142. Second routing system 136 may comprise one or more devices that may receive requests for services from first cloud service 138 or third cloud service 142 and routes them to second cloud service 140 or fourth cloud service 144. Consistent with embodiments of the disclosure, each cloud service may have its own corresponding routing system and may not share a routing system with another cloud service.

First cloud service 138 may comprise a first cloud service first component 152, a first cloud service second component 154, and a first cloud service third component 156. First cloud service first component 152, first cloud service second component 154, and first cloud service third component 156 may comprise different versions of a software artifact that defines how first cloud service 138 may service requests it receives. For example, these different versions may be correspondingly configured to work with different hardware types of plurality of client devices 102. Moreover, these different versions may be configured to give correspondingly different experiences to different users of plurality of client devices 102.

Second cloud service 140 may comprise a second cloud service first component 158, a second cloud service second component 160, and a second cloud service third component 162. Second cloud service first component 158, second cloud service second component 160, and second cloud service third component 162 may comprise different versions of a software artifact that defines how second cloud service 140 may service requests it receives. For example, these different versions may be correspondingly configured to work with different hardware types of plurality of client devices 102. Moreover, these different versions may be configured to give correspondingly different experiences to different users of plurality of client devices 102.

Third cloud service 142 may comprise a third cloud service first component 164, a third cloud service second component 166, and a third cloud service third component 168. Third cloud service first component 164, third cloud service second component 166, and third cloud service third component 168 may comprise different versions of a software artifact that defines how third cloud service 142 may service requests it receives. For example, these different versions may be correspondingly configured to work with different hardware types of plurality of client devices 102. Moreover, these different versions may be configured to give correspondingly different experiences to different users of plurality of client devices 102.

Fourth cloud service 144 may comprise a fourth cloud service first component 170, a fourth cloud service second component 172, and a fourth cloud service third component 174. Fourth cloud service first component 170, fourth cloud service second component 172, and fourth cloud service third component 174 may comprise different versions of a software artifact that defines how fourth cloud service 144 may service requests it receives. For example, these different versions may be correspondingly configured to work with different hardware types of plurality of client devices 102. Moreover, these different versions may be configured to give correspondingly different experiences to different users of plurality of client devices 102.

Consistent with embodiments of the disclosure, at run time, each of the plurality of client devices 102 may run a combination of client software components (i.e., artifacts) and use the combination of cloud service software components defined by a package. Accordingly, the system operator may guarantee that these software components operate correctly together and provide a desired experience. For example, client provisioning system 146 may provision the correct versions of client components and application on plurality of client devices 102 based on the package assigned to each of plurality of client devices 102. Rules engine 148 may assign a package to each of plurality of client devices 102. Cloud database may store: i) packages that may references one version of each of the controlled apps, services, components, and other artifacts; and ii) rules for assigning a package to a client device.

As shown in FIG. 1, based on rules in the rules engine 148, second client device 112 may have been assigned a package that includes the following:

> Client Device Application version 1.3 (e.g., second client device application 122)
> First Client Component version 3.4 (e.g., second client device first component 124)
> Second Client Component version 3.1 (e.g., second client device second component 126)
> First cloud service component version 1.0 (e.g., first cloud service first component 152)
> Second cloud service component version 2.1 (e.g., second cloud service first component 158)
> Third cloud service component version 4.5 (e.g., third cloud service first component 164)
> Fourth cloud service component version v27.4 (e.g., fourth cloud service first component 170)

At client provisioning time, second client device 112 may be provisioned by client provisioning system 146 with the versions of the client software artifacts (i.e., second client device application 122, second client device first component 124, and second client device second component 126) described in the above package.

When second client device 112 sends a request to cloud computing system 104, the request may be labeled by first routing system 134 so that the rest of the routing system (e.g., second routing system 136) can fan the request out through cloud computing system 104 to the versions of cloud services described in the package (first cloud service first component 152, second cloud service first component 158, third cloud service first component 164, and fourth cloud service first component 170). Accordingly, the cloud services as well as the routing systems may fan out requests while passing on tagging.

The above package may have been assigned to second client device 112 because second client device application 122, second client device first component 124, and second client device second component 126 may work with second client device 112's hardware type (e.g., second hardware type). Moreover, the above package may have been assigned to second client device 112 because these different versions may be configured to give a desired experience to the user of second client device 112 based, for example, on a community that the user of second client device 112 corresponds to or second client device 112's hardware type.

CI/CD pipeline 106 develops and tests code in a development environment before being automatically deployed in a production environment (e.g., cloud computing system 104, plurality of client devices 102). Packages can be defined in the development environment, but new packages may be prevented from being defined in the production environment. CI/CD pipeline 106 may ensure that packages have been tested before allowing them to be promoted to the production environment. CI/CD pipeline 106 can ensure that the software components that comprise a package have been tested together. In this way, the combination of client and cloud applications and software components used by a client will have been tested before being allowed to be used together in the production environment. Through operator interface 108, the operator can define packages and rules once the packages have been deployed to client database 150 from CI/CD pipeline 106.

Figure 2:
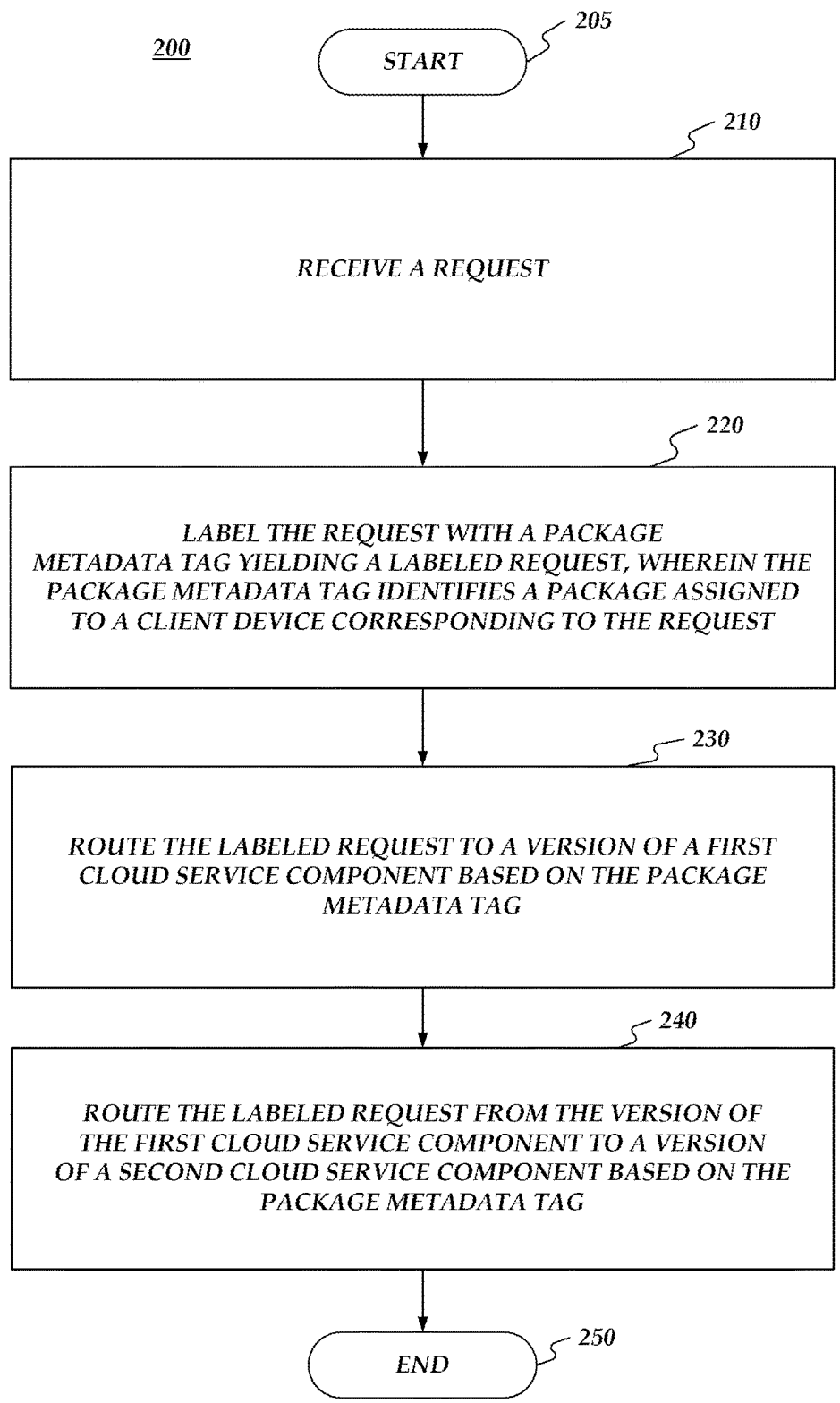
FIG. 2 is a flow chart of a method for providing client and cloud synchronization.

FIG. 2 is a flow chart setting forth the general stages involved in a method 200 consistent with an embodiment of the disclosure for providing client and cloud synchronization. Method 200 may be implemented using cloud computing system 104 as described in more detail above with respect to FIG. 1. Ways to implement the stages of method 200 will be described in greater detail below.

Method 200 may begin at starting block 205 and proceed to stage 210 where first routing system 134 may receive a request. For example, second client device 112 may have been assigned and provisioned by client provisioning system 146 with the package described in the above example. The package may correspond to, but is not limited to, cloud based television. Using one or more of second client device application 122, second client device first component 124, and second client device second component 126, the user of second client device 112 may cause second client device 112 to send the request to cloud computing system 104 for servicing where it may be received by first routing system 134.

From stage 210, where first routing system 134 receives the request, method 200 may advance to stage 220 where first routing system 134 may label the request with a package metadata tag yielding a labeled request. The package metadata tag may identify the package assigned to second client device 112 corresponding to the request. For example, the request my include identification information identifying second client device 112, for example, a Media Access Control (MAC) address of second client device 112. Based on the identification information, first routing system 134 may look up in client database 150 which package has been assigned to second client device 112. First routing system 134 may create the package metadata tag that identifies the package assigned to second client device 112 and then label the received request with the created package metadata tag. For example, first routing system 134 may place the created package metadata tag in the Hypertext Transfer Protocol (HTTP) header of the received request.

Consistent with embodiments of the disclosure, rather than first routing system 134, a separate tagging system (not shown) may receive the request from second client device 112 and then label the received request with the package metadata tag that identifies the package assigned to second client device 112 corresponding to the received request. Once labeled, the tagging system may route the labeled request to first routing system 134.

Once first routing system 134 labels the request in stage 220, method 200 may continue to stage 230 where first routing system 134 may route the labeled request to a version of a first cloud service component (e.g., first cloud service first component 152) based on the package metadata tag. For example, the received request may indicate that it needs servicing by first cloud service 138. Because the package (e.g., indicated by the package metadata tag now on the request) indicates that first cloud service first component 152 should be used when service is performed by first cloud service 138, first routing system 134 may route the labeled request to first cloud service first component 152 for serving by first cloud service 138. If another version had been indicated by the assigned package, first routing system 134 may route routed to the other version.

After first routing system 134 routes the labeled request in stage 230, method 200 may proceed to stage 240 where second routing system 136 may route the labeled request from the version of the first cloud service component (e.g., first cloud service first component 152) to a version of a second cloud service component (e.g., second cloud service first component 158) based on the package metadata tag. For example, the routed request may indicate that it needs servicing by second cloud service 140. Because the package (e.g., indicated by the package metadata tag now on the routed request) indicates that second cloud service first component 158 should be used when service is performed by second cloud service first component 158, second routing system 136 may route the request to second cloud service first component 158 for serving by second cloud service 140. If another version had been indicated by the assigned package, second routing system 136 may route routed to the other version. After the request has been serviced by cloud computing system 104, a response to the request may be returned to second client device 112 from cloud computing system 104. Once second routing system 136 routes the labeled request in stage 240, method 200 may then end at stage 250.

Figure 3:
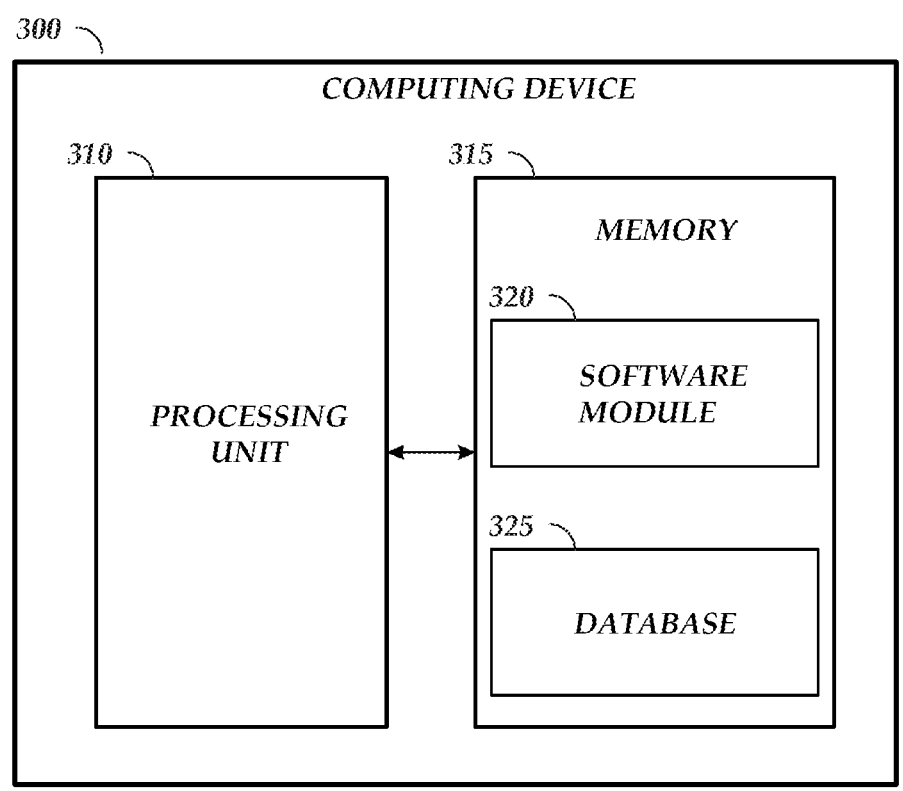
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for providing client and cloud synchronization, including for example, any one or more of the stages from method 200 described above with respect to FIG. 2. Computing device 300 may provide an operating environment for any one of more of plurality of client devices 102, first routing system 134, second routing system 136, first cloud service 138, second cloud service 140, third cloud service 142, fourth cloud service 144, client provisioning system 146, rules engine 148, cloud database 150, CI/CD pipeline 106, and operator interface 108.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a camera, a load balancer or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a request;
   labeling the request with a package metadata tag yielding a labeled request, wherein the package metadata tag identifies a package assigned to a client device corresponding to the request, wherein labeling the request with the package metadata tag comprises:
      performing a look up in a client database for identification information identifying the client device, the identification information being received in the request, the client database comprising a plurality of packages, each of the plurality of packages comprising a combination of client software components and a combination of cloud software components corresponding to the combination of client software components, and rules for assigning the plurality of packages, and
      identifying the package assigned to the client device from the client database;
   routing the labeled request to a version of a first cloud service component based on the package metadata tag; and
   routing the labeled request from the version of the first cloud service component to a version of a second cloud service component based on the package metadata tag.

2. The method of claim 1, wherein receiving the request comprises receiving the request from the client device.

3. The method of claim 1, wherein the package comprises at least one artifact for the client device, the first cloud service component, and the second cloud service component.

4. The method of claim 1, wherein routing the labeled request to the version of the first cloud service component comprises routing the labeled request to the version of the first cloud service component by a first routing system.

5. The method of claim 1, wherein routing the labeled request to the version of the first cloud service component based on the package metadata tag comprises:
   querying a rules engine based on the package metadata tag; and
   receiving from the rules engine an identifier of the version of the first cloud service component.

6. The method of claim 1, wherein routing the labeled request from the version of the first cloud service component to the version of the second cloud service component comprises routing the labeled request from the version of the first cloud service component to the version of the second cloud service component by a second routing system.

7. The method of claim 1, wherein routing the labeled request from the version of the first cloud service component to the version of the second cloud service component comprises:
   querying a rules engine based on the package metadata tag; and
   receiving from the rules engine an identifier of the version of the second cloud service component.

8. The method of claim 1, further comprising provisioning the client device with at least one artifact based on the package assigned to the client device.

9. The method of claim 8, wherein provisioning the client device with the at least one artifact comprises provisioning the client device with the at least one artifact comprising a client device application.

10. The method of claim 8, wherein provisioning the client device with the at least one artifact comprises provisioning the client device with the at least one artifact comprising a client device component.

11. The method of claim 1, further comprising assigning the package assigned to the client device based on a hardware type corresponding to the client device.

12. The method of claim 1, further comprising assigning the package assigned to the client device based on a community corresponding to the client device.

13. A system comprising:
   a memory storage; and
   a processing unit coupled to the memory storage, wherein the processing unit is operative to:
      receive a request;
      label the request with a package metadata tag yielding a labeled request, wherein the package metadata tag identifies a package assigned to a client device corresponding to the request, wherein the processing unit being operative to label the request with the package metadata tag comprises the processing unit being operative to:

perform a look up in a client database for identification information identifying the client device, the identification information being received in the request, the client database comprising a plurality of packages, each of the plurality of packages comprising a combination of client software components and a combination of cloud software components corresponding to the combination of client software components, and rules for assigning the plurality of packages; and identify the package assigned to the client device from the client database; and route the labeled request to a version of a first cloud service component based on the package metadata tag.

14. The system of claim 13, wherein the processing unit being operative to receive the request comprises the processing unit being operative to receive the request from the client device.

15. The system of claim 13, wherein the package comprises at least one artifact for the client device, the first cloud service component, and the second cloud service component.

16. The system of claim 13, wherein the processing unit being operative to route the labeled request to the version of the first cloud service component based on the package metadata tag comprises the processing unit being operative to:

query a rules engine based on the package metadata tag; and receive from the rules engine an identifier of the version of the first cloud service component.

17. A non-transitory computer-readable medium that stores a set of instructions which when executed perform a method comprising:

receiving a request;

labeling the request with a package metadata tag yielding a labeled request, wherein the package metadata tag identifies a package assigned to a client device corresponding to the request, wherein labeling the request with the package metadata tag comprises:

performing a look up in a client database for identification information identifying the client device, the identification information being received in the request, the client database comprising a plurality of packages, each of the plurality of packages comprising a combination of client software components and a combination of cloud software components corresponding to the combination of client software components, and rules for assigning the plurality of packages; and identifying the package assigned to the client device from the client database; and routing the request to a version of a first cloud service component based on the package metadata tag.

18. The non-transitory computer-readable medium of claim 17, wherein receiving the request comprises receiving the request from the client device.

19. The non-transitory computer-readable medium of claim 17, wherein labeling the request with the package metadata tag comprises labeling the request with the package metadata tag wherein the package comprises at least one artifact for the client device, the first cloud service component, and the second cloud service component.

20. The non-transitory computer-readable medium of claim 17, wherein routing the labeled request to the version of the first cloud service component based on the package metadata tag comprises:

querying a rules engine based on the package metadata tag; and receiving from the rules engine an identifier of the version of the first cloud service component.

* * * * *